United States Patent
Siman et al.

(10) Patent No.: US 12,164,646 B2
(45) Date of Patent: Dec. 10, 2024

(54) AUTOMATIC IDENTIFICATION OF FLAWS IN SOFTWARE SYSTEMS

(71) Applicant: Checkmarx Ltd., Ramat Gan (IL)

(72) Inventors: Maty Siman, Tel Aviv (IL); Alexander Roichman, Ramat-Gan (IL)

(73) Assignee: CHECKMARX LTD., Ramat Gan (IL)

( * ) Notice: Subject to any disclaimer, the term of this patent is extended or adjusted under 35 U.S.C. 154(b) by 284 days.

(21) Appl. No.: 17/402,544

(22) Filed: Aug. 15, 2021

(65) Prior Publication Data

US 2022/0067173 A1 Mar. 3, 2022

Related U.S. Application Data

(60) Provisional application No. 63/070,849, filed on Aug. 27, 2020.

(51) Int. Cl.
*G06F 21/57* (2013.01)
*G06F 11/36* (2006.01)

(52) U.S. Cl.
CPC .......... *G06F 21/577* (2013.01); *G06F 11/366* (2013.01); *G06F 2221/033* (2013.01)

(58) Field of Classification Search
CPC .......... G06F 21/577; G06F 11/366; G06F 2221/033; G06F 2221/2141; G06F 21/52; G06F 21/566
See application file for complete search history.

(56) References Cited

U.S. PATENT DOCUMENTS

| | | |
|---|---|---|
| 7,237,265 B2 | 6/2007 | Reshef et al. |
| 7,392,545 B1 | 6/2008 | Weber et al. |
| 7,647,631 B2 | 1/2010 | Sima |
| 7,975,296 B2 | 7/2011 | Apfelbaum et al. |
| 8,528,093 B1 * | 9/2013 | Kureha ................. G06F 21/566 726/25 |
| 8,819,772 B2 | 8/2014 | Bettini et al. |

(Continued)

FOREIGN PATENT DOCUMENTS

| | | |
|---|---|---|
| CN | 106066827 A | 11/2016 |
| CN | 107463505 A | 12/2017 |

(Continued)

OTHER PUBLICATIONS

EP Application # 21192635.7 Search Report dated Jan. 20, 2022.

(Continued)

*Primary Examiner* — Meng Li
(74) *Attorney, Agent, or Firm* — MEITAR PATENTS LTD.

(57) ABSTRACT

A system includes an output device and a processor. The processor is configured to analyze a software system, which includes an application subsystem and a configuration subsystem, so as to generate an output describing (i) one or more operations performed by the application subsystem, and (ii) one or more configurations for the application subsystem, which are provided by the configuration subsystem. The processor is further configured to identify, based on the output, at least one flaw in the software system that results from a combination of the operations with the configurations, and to output via the output device, in response to identifying the flaw, an indication of the flaw. Other embodiments are also described.

20 Claims, 5 Drawing Sheets

(56) References Cited

U.S. PATENT DOCUMENTS

| | | | |
|---|---|---|---|
| 8,844,043 | B2 | 9/2014 | Williams et al. |
| 8,898,272 | B1 | 11/2014 | Young et al. |
| 9,128,728 | B2 | 9/2015 | Siman |
| 9,235,722 | B2* | 1/2016 | Vyas .................. G06F 21/6218 |
| 9,317,399 | B2 | 4/2016 | Boshernitsan et al. |
| 9,882,930 | B2 | 1/2018 | Holt |
| 9,946,880 | B2 | 4/2018 | Lee et al. |
| 10,015,186 | B1* | 7/2018 | Tamir .................. H04L 63/1433 |
| 10,362,046 | B1* | 7/2019 | Srinivasan .......... H04L 63/1433 |
| 10,387,656 | B2 | 8/2019 | Roichman et al. |
| 11,025,508 | B1* | 6/2021 | Madala .................... H04L 41/22 |
| 11,449,640 | B1* | 9/2022 | Sanders ................ H04L 63/102 |
| 11,652,839 | B1* | 5/2023 | Aloisio ............... H04L 63/1433 |
| | | | 726/25 |
| 11,677,773 | B2* | 6/2023 | Iyer ........................ G06F 21/577 |
| | | | 726/25 |
| 2004/0205411 | A1 | 10/2004 | Hong et al. |
| 2005/0257207 | A1 | 11/2005 | Blumfield et al. |
| 2007/0044153 | A1 | 2/2007 | Schuba et al. |
| 2007/0074169 | A1 | 3/2007 | Chess et al. |
| 2008/0209276 | A1 | 8/2008 | Stubbs et al. |
| 2009/0019545 | A1 | 1/2009 | Ben-Itzhak et al. |
| 2009/0113550 | A1 | 4/2009 | Costa et al. |
| 2009/0300764 | A1 | 12/2009 | Freeman |
| 2010/0058475 | A1 | 3/2010 | Thummalapenta et al. |
| 2010/0125913 | A1 | 5/2010 | Davenport et al. |
| 2010/0281248 | A1 | 11/2010 | Lockhart et al. |
| 2011/0030061 | A1 | 2/2011 | Artzi et al. |
| 2011/0034733 | A1 | 2/2011 | Funahashi et al. |
| 2012/0102474 | A1* | 4/2012 | Artzi ...................... G06F 21/577 |
| | | | 717/157 |
| 2012/0167209 | A1 | 6/2012 | Molnar et al. |
| 2013/0019314 | A1 | 1/2013 | Ji et al. |
| 2013/0024942 | A1 | 1/2013 | Wiegenstein et al. |
| 2013/0247198 | A1 | 9/2013 | Muttik et al. |
| 2013/0312102 | A1 | 11/2013 | Brake et al. |
| 2013/0347116 | A1* | 12/2013 | Flores ................ H04L 63/1433 |
| | | | 726/25 |
| 2014/0165204 | A1 | 6/2014 | Williams et al. |
| 2014/0281740 | A1 | 9/2014 | Casado et al. |
| 2014/0331327 | A1 | 11/2014 | Maor et al. |
| 2014/0372985 | A1 | 12/2014 | Levin et al. |
| 2015/0261955 | A1 | 9/2015 | Huang et al. |
| 2015/0309813 | A1* | 10/2015 | Patel ...................... G06F 21/577 |
| | | | 703/22 |
| 2017/0091457 | A1 | 3/2017 | Zakorzhevsky et al. |
| 2017/0123925 | A1 | 5/2017 | Patnaik et al. |
| 2017/0169229 | A1* | 6/2017 | Brucker ................ G06F 21/566 |
| 2018/0025161 | A1 | 1/2018 | Gauthier et al. |
| 2018/0173608 | A1* | 6/2018 | Paulraj ................. G06F 11/3664 |
| 2018/0330102 | A1 | 11/2018 | Siman et al. |
| 2019/0020674 | A1* | 1/2019 | Vervier ............... H04L 63/1408 |
| 2019/0129779 | A1 | 5/2019 | Adamson et al. |
| 2020/0244532 | A1 | 7/2020 | Knudsen et al. |
| 2020/0272743 | A1* | 8/2020 | Song .................. H04L 63/1433 |
| 2020/0379874 | A1* | 12/2020 | Lu .......................... G06F 11/362 |
| 2021/0014256 | A1* | 1/2021 | Malhotra ............ H04L 63/1425 |
| 2021/0037040 | A1* | 2/2021 | Aleks .................. H04L 63/1433 |
| 2021/0192586 | A1* | 6/2021 | Gomez ................ G08G 1/0129 |
| 2022/0247769 | A1* | 8/2022 | Erlingsson ............ H04L 67/535 |
| 2023/0211435 | A1* | 7/2023 | Nishiwaki ............ B23K 31/006 |
| | | | 219/121.11 |

FOREIGN PATENT DOCUMENTS

| | | |
|---|---|---|
| WO | 2008047351 A1 | 4/2008 |
| WO | 2016108162 A1 | 7/2016 |
| WO | 2016113663 A1 | 7/2016 |

OTHER PUBLICATIONS

Coverity Inc., "Coverity® Development Testing Platform", Product Overview, pp. 1-5, year 2012.

Chess et al., "Dynamic Taint Propagation", Black Hat Briefings, pp. 1-70, Feb. 21, 2008.

Balzarotti et al., "Saner: Composing Static and Dynamic Analysis to Validate Sanitization in Web Applications", IEEE Symposium on Security and Privacy, pp. 387-401, May 18, 2018.

Narumoto et al., "Compensating Transaction Pattern," Microsoft, Azure, pp. 1-6, Jun. 23, 2017, as downloaded from https://docs.microsoft.com/en-us/azure/architecture/patterns/compensating-transaction.

Microsoft, "Data Consistency Primer," pp. 1-10, Aug. 26, 2015, as downloaded from https://docs.microsoft.com/en-us/previous-versions/msp-n-p/dn589800(v=pandp.10)?redirectedfrom=MSDN—No Author.

Goertz et al., "Dependency Diagrams: Reference," Microsoft, Visual Studio, pp. 1-5, Sep. 28, 2018, as downloaded from https://docs.microsoft.com/en-us/visualstudio/modeling/layer-diagrams-reference?view=vs-2019.

Wikipedia, "Data Deduplication," pp. 1-7, last edited May 25, 2021.

Wikipedia, "Infrastructure as Code,", pp. 1-4, last edited Aug. 19, 2021.

The Kubernetes Authors, "Kubernetes—Production-Grade Container Orchestration," Documentation, The Linux Foundation, pp. 1-6, year 2021, as downloaded from https://kubernetes.io/.

Polencic, "How do you visualise dependencies in your Kubernetes YAML files?," Learnk8s, pp. 1-8, May 2019, as downloaded from https://learnk8s.io/visualise-dependencies-kubernetes.

Twitter Privacy Center, "An Incident Impacting your Account Identity," pp. 1-3, Feb. 3, 2020, as downloaded from https://privacy.twitter.com/en/blog/2020/an-incident-impacting-your-account-identity.

Alibaba Clouder, "Visualizing a Microservices Architeture with AHAS," Blog, pp. 1-10, Mar. 25, 2019, as downloaded from https://www.alibabacloud.com/blog/visualizing-a-microservices-architecture-with-ahas_594621.

Microsoft, "Implementing a Zero Trust security model at Microsoft," Inside Track, pp. 1-6, Mar. 19, 2021, as downloaded from https://www.microsoft.com/en-us/insidetrack/implementing-a-zero-trust-security-model-at-microsoft.

Escobar, "Everything as Code," Blog, Dynatrace LLC, pp. 1-10, Oct. 17, 2019, as downloaded from https://www.dynatrace.com/news/blog/everything-as-code/#:~:text=Everything%20as%20Code%20can%20be,%2C%20network%20configurations%2C%20and%20pipelines.

Abel, "Code or Configuration or Configuration in Code," pp. 1-6, posted Jun. 24, 2013, as downloaded from https://coding.abel.nu/2013/06/code-or-configuration-or-configuration-in-code/.

Erik, "Configuartion as Code: Everything You Need to Know," Blog, CloudBees, pp. 1-7, Dec. 18, 2018, as downloaded from https://www.cloudbees.com/blog/configuration-as-code-everything-need-know.

Spring et al., "Everything-as-Code," Open Practice Library, pp. 1-3, Aug. 15, 2018, as downloaded from https://openpracticelibrary.com/practice/everything-as-code/.

Red Hat, "Ansible in Depth," Whitepaper, pp. 1-5, year 2017.

Shustin, "Remote Cloud Execution—Critical Vulnerabilities in Azure Cloud Infrastructure (Part I)," Check Point Research, p. 1-10, Jan. 30, 2020.

EP Application # Office Action dated Sep. 15, 2023.

* cited by examiner

AUTOMATIC IDENTIFICATION OF FLAWS IN SOFTWARE SYSTEMS

CROSS-REFERENCE TO RELATED APPLICATIONS

The present application claims the benefit of U.S. Provisional Application 63/070,849, entitled "Automatic identification of flaws in software systems," filed Aug. 27, 2020, whose disclosure is incorporated herein by reference.

FIELD OF THE INVENTION

The present invention is related to the field of software-system testing.

BACKGROUND

Configuration as Code (CaC) is a process for managing application configuration data in configuration code. An example of CaC is Infrastructure as Code (IaC), which is used (e.g., by cloud computing centers) to implement, in a type of configuration code referred to as "infrastructure code," the infrastructure on which various applications may be run.

Per typical CaC convention, configuration code for configuring an application is defined separately from the application code that determines the functionality of the application. Thus, for example, application code may define an operation in which a message is broadcast over a particular data bus, while configuration code may define the properties of the data bus.

Typically, the application code of a cloud software system (i.e., a software system configured to run on cloud-computing infrastructure) is distributed over loosely coupled "services," also referred to as "microservices," with each service implementing different respective functions within the context of the application. For example, an online sales application may include (i) a façade service, which receives orders via an externally-facing application program interface (API), (ii) an order service, which manages the orders, (iii) a stock service, which tracks the stock available for sale, and (iv) a payment service, which manages payments for the orders. The services generally communicate with each other over a layer of infrastructure known as a "service mesh," which may be configured in infrastructure code.

SUMMARY OF THE INVENTION

There is provided, in accordance with some embodiments of the present invention, a system including an output device and a processor. The processor is configured to analyze a software system, which includes an application subsystem and a configuration subsystem, so as to generate an output describing (i) one or more operations performed by the application subsystem, and (ii) one or more configurations for the application subsystem, which are provided by the configuration subsystem. The processor is further configured to identify, based on the output, at least one flaw in the software system that results from a combination of the operations with the configurations, and to output, via the output device, an indication of the flaw in response to identifying the flaw.

In some embodiments, the output includes a first data structure describing the operations and a second data structure describing the configurations, and the processor is configured to identify the flaw by querying the first data structure and the second data structure.

In some embodiments, the first data structure includes a data-flow graph (DFG).

In some embodiments, the first data structure includes a document object model (DOM).

In some embodiments, the first data structure includes a control-flow graph (CFG).

In some embodiments, the second data structure includes a Javascript Object Notation (JSON) structure.

In some embodiments, the second data structure includes an Extensible Markup Language (XML) structure.

In some embodiments, the processor is configured to identify the flaw based on a manner in which the configurations configure a resource used by one of the operations.

In some embodiments, the processor is configured to identify the flaw in response to the configurations configuring the resource as accessible from an Internet.

In some embodiments, the operation exchanges data with the resource, and the processor is configured to identify the flaw in response to the configurations permitting access to the resource by users who are unauthorized to access the data.

In some embodiments, the resource includes a log, the and the processor is operation writes data to the log, configured to identify the flaw in response to the configurations not configuring the log to be stored persistently.

In some embodiments, the resource includes an application programming interface (API).

In some embodiments, the processor is configured to identify the flaw by:
  identifying one of the operations that calls an application programming interface (API) with a particular argument, in response to identifying the operation, ascertaining whether the argument is declared in the configurations, and provided the argument is declared, a manner in which the argument is declared, and
  in response to the ascertaining, identifying the flaw.

In some embodiments, the processor is configured to identify the flaw by:
  identifying a declaration in the configurations,
  in response to identifying the declaration, ascertaining whether any of the operations calls an application programming interface (API) with an argument declared by the declaration, and provided any of the operations calls the API, a manner in which any of the operations calls the API, and
  in response to the ascertaining, identifying the flaw.

In some embodiments, the application subsystem includes software code that defines the operations, and the processor is configured to analyze the software system by parsing the software code.

In some embodiments, the application subsystem includes software code that defines the operations, and the processor is configured to analyze the software system by running the code.

In some embodiments, the processor is further configured to modify code of the configuration subsystem so as to correct the flaw.

In some embodiments,
  the at least one flaw includes multiple flaws,
  the processor is further configured to compute an order of priority for correcting the flaws, and
  the processor is configured to output the indication so as to indicate the order of priority.

In some embodiments, the processor is further configured to ascertain, based on the configurations and different operations, respective positions, in a topology of the application subsystem, of multiple services in the application subsystem, and the processor is configured to compute the order of priority based on the positions.

In some embodiments, the processor is configured to compute the order of priority based on different respective levels of security vulnerability associated with the positions.

In some embodiments, the processor is configured to compute the order of priority such that correcting a first flaw affecting one of the services that exchanges data with a greater number of others of the services is prioritized over correcting a second flaw affecting another one of the services that exchanges data with a lesser number of others of the services.

In some embodiments, the flaws include multiple security vulnerabilities associated with different respective resources, and the processor is configured to compute the order of priority such that correcting any one of the security vulnerabilities associated with one of the resources that is configured, by the configurations, as accessible from an Internet is prioritized over correcting any other one of the security vulnerabilities associated with another one of the resources that is not configured, by the configurations, as accessible from the Internet.

In some embodiments, the flaw results from one of the operations being non-idempotent and being allowed, by the configurations, to be executed multiple times without deduplication.

In some embodiments, the flaw results from the configurations allowing a particular one of the operations to be performed without a prior authentication of a user of the application subsystem.

In some embodiments, the flaw results from the configurations configuring a service in the application subsystem to have a position in a topology of the application subsystem that renders the service susceptible to a particular type of attack associated with a particular one of the operations performed by the service.

In some embodiments, the flaw results from one of the operations being vulnerable to a particular type of attack for which the configurations do not provide a protection mechanism.

In some embodiments, the flaw results from one of the operations sending unencrypted data without the configurations providing a mechanism for securing the unencrypted data.

In some embodiments, the flaw results from (i) a first service in the application subsystem transferring data to an address that is assigned, by the configurations, to a second service in the application subsystem, and (ii) the second service writing to a location to which access by users who are unauthorized to access the data is permitted.

In some embodiments, the flaw results from (i) a first service in the application subsystem transferring a query or a command to an address that is assigned, by the configurations, to a second service in the application subsystem, and (ii) the second service not providing a defense against an injection attack.

In some embodiments, the flaw includes a security vulnerability resulting from the configurations configuring a first service in the application subsystem and a second service in the application subsystem to use a common resource.

In some embodiments, the flaw results from the configurations exposing a resource not used by the application subsystem.

In some embodiments, the flaw results from one of the operations conflicting with one of the configurations.

In some embodiments, the application subsystem includes software code that defines the operations, and the configurations configure a process for building the software code.

In some embodiments, the configurations configure a process for testing the application subsystem.

In some embodiments, the configurations configure a deployment of the application subsystem.

In some embodiments, the configurations configure runtime behavior of the application subsystem.

In some embodiments, the configuration subsystem includes a software infrastructure on which the operations are performed.

There is further provided, in accordance with some embodiments of the present invention, a method, including, using a processor, analyzing a software system, which includes an application subsystem and a configuration subsystem, so as to generate an output describing (i) one or more operations performed by the application subsystem, and (ii) one or more configurations for the application subsystem, which are provided by the configuration subsystem. The method further includes, based on the output, identifying at one flaw in the software system that results from a combination of the operations with the configurations, and in response to identifying the flaw, outputting an indication of the flaw.

There is further provided, in accordance with some embodiments of the present invention, a computer software product including a tangible non-transitory computer-readable medium in which program instructions are stored. The instructions, when read by a processor, cause the processor to analyze a software system, which includes an application subsystem and a configuration subsystem, so as to generate an output describing (i) one or more operations performed by the application subsystem, and (ii) one or more configurations for the application subsystem, which are provided by the configuration subsystem. The instructions further cause the processor to identify, based on the output, at least one flaw in the software system that results from a combination of the operations with the configurations, and to output an indication of the flaw in response to identifying the flaw.

The present invention will be more fully understood from the following detailed description of embodiments thereof, taken together with the drawings, in which:

DETAILED DESCRIPTION OF EMBODIMENTS

Terminology

Figure 1:
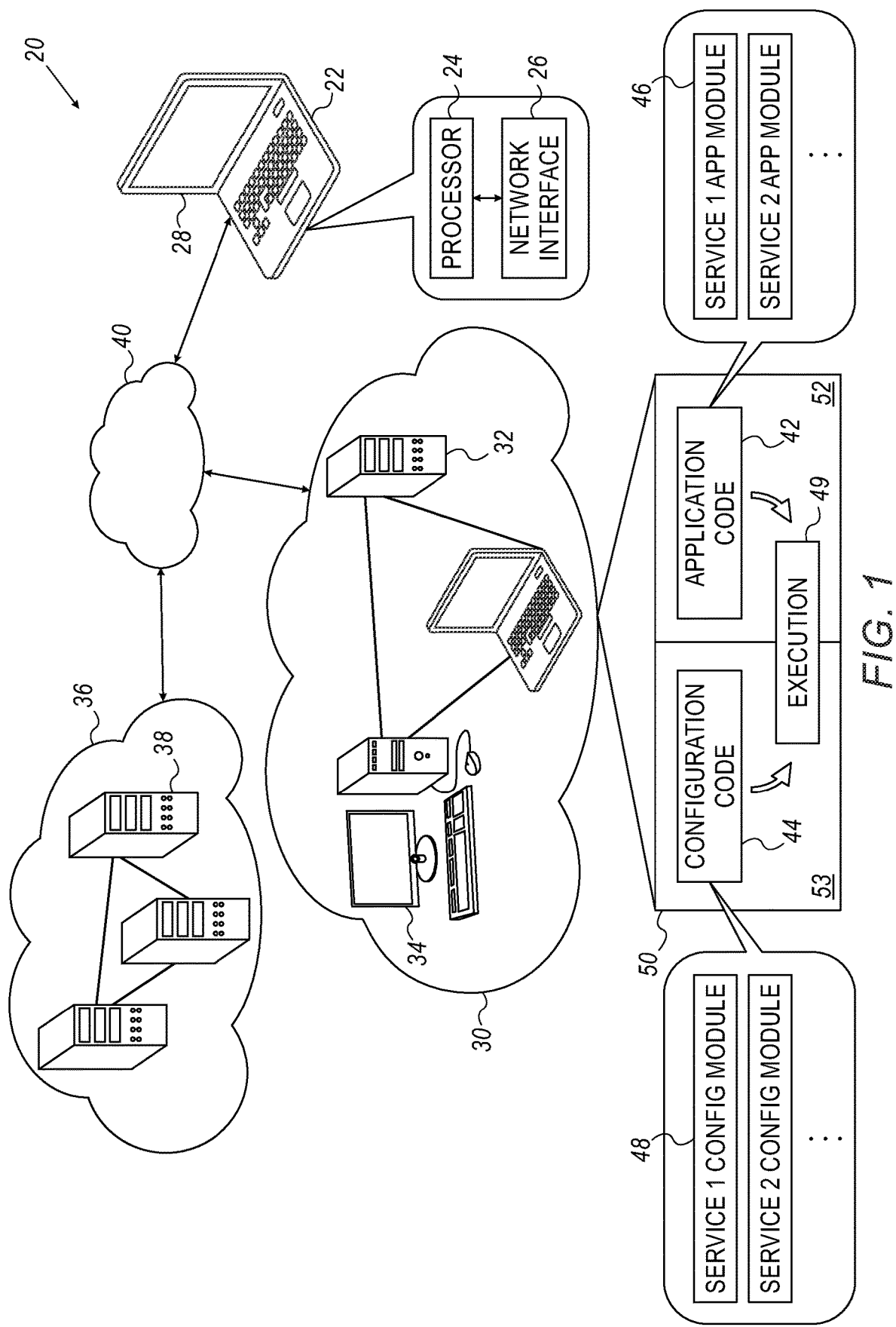
FIG. 1 is a schematic illustration of a system for analyzing a software system, in accordance with some embodiments of the present invention.

In the context of the present application, including the claims, the term "application code" may refer to any computer code, written in any compiled or scripting language, that performs any suitable operations within the context of computer application. Such operations may include, for example, performing queries, exchanging data, and processing data. In addition to code for performing operations, application code may include associated configurations. For example, application code written in Java may include "application.property" configurations, which may include, for example, database connection strings. Application code may include both proprietary code, developed by the proprietor of the application, and third-party code.

In the context of the present application, including the claims, the term "configuration code" may include any computer code, written in any compiled or scripting language, that configures a computer application in any way, such as by configuring the building, testing, provisioning, or deployment of the application, by assigning values to environment variables, by configuring resources used by the application, or by configuring the runtime environment of the application. In a configuration may include cloud software system, code declarations and functions associated with a cloud operating system (OS), an API Gateway, a Domain Name System (DNS), a service mesh, firewalls and other network components, and/or cloud orchestration. Configuration code may be used by a CaC tool such as Kubernetes, Docker, Istio, Ansible, Terraform by HashiCorp, Inc., AWS, Azure, Google Cloud, or Jenkins.

In the context of the present application, including the claims, the term "application subsystem" refers to the portions of a software system whose properties are associated with or derive from application code. Thus, for example, an application subsystem may include application code, optionally together with binary files compiled from the application code. Similarly, the term "configuration subsystem" refers to the portions of a software system whose properties are associated with or derive from configuration code. Thus, for example, a configuration subsystem may include configuration code, optionally together with binary files compiled from the configuration code (e.g., a Docker image compiled from Docker configuration code). The execution of the software system, in which both application code and configuration code are run, may be said to belong both to the application subsystem and to the configuration subsystem of the software system.

In the context of the present application, including the claims, the "topology" of an application sub-system refers to the scheme per which the services belonging to the application sub-system exchange data (or "communicate") with each other and with external entities. The "position" of any service in the topology refers to the functioning of the service in the context of this scheme, such that ascertaining the position of the service is equivalent to ascertaining which other services exchange data with the service, and whether the service also exchanges data with any external entities. A topology may be represented as a graph in which each node represents a different respective service, and each edge connecting any of the nodes to another node or to a point outside the graph represents the exchanging of data.

In the context of the present application, including the claims, a "flaw" in a software system may include any defect that compromises the security of the system (i.e., increases the vulnerability of the system to attack) or compromises the performance of the system. A flaw may be corrected by removing code, adding code, or modifying code.

Overview

It is challenging, when performing software-system testing, to generate output that includes an accurate and precise list of flaws in the software system. For example, including every line of code that is potentially problematic, such as every line of code in which sensitive data is communicated or stored, leads to an imprecise list containing many false positives. Moreover, even if such an approach is employed, more subtle flaws may be missed.

Advantageously, however, the present inventors realized that this challenge may be overcome, at least for software systems utilizing CaC. In particular, the present inventors realized that by analyzing both the application subsystem and the configuration subsystem of such software systems and correlating between the analyses, flaws may be identified more accurately and precisely. For example, the communication of sensitive data may not be identified as cause for a flaw, provided that configuration the subsystem configures an encryption mechanism for the data. Conversely, a configuration of a firewall with permissive policies may be identified as cause for a flaw, in the event that the permissive policies are not required by the application subsystem.

Hence, embodiments of the present invention provide a processor configured to analyze both subsystems, so as to identify both the operations of the application subsystem and the configurations of the configuration subsystem. Subsequently to identifying the operations and configurations, the processor looks for any flaw that results from a combination of the operations with the configurations. The processor further outputs an indication of each such flaw, and, optionally, automatically corrects the flaw, e.g., by adding, removing, or modifying a configuration.

In some embodiments, in the event that multiple flaws are found, the processor further computes an order of priority for correcting the flaws. For example, the processor, based on the operations and configurations, may ascertain the topology of the application subsystem, and then compute the order of priority based on the topology. Thus, for example, the processor may prioritize correcting a flaw in a service that exchanges data with a larger number of other services over correcting a similar type of flaw in another service that exchanges data with a smaller number of other services. Alternatively or additionally, the include in the event that flaws multiple security vulnerabilities associated with different respective resources, the processor may prioritize a security vulnerability associated with a publicly-accessible resource over another security vulnerability associated with a non-publicly-accessible resource, given that the former vulnerability is more likely to be exploited.

In some cases, the processor identifies a problematic operation/configuration combination beginning with the application subsystem. For example, the processor may first identify an operation of the application subsystem that calls an application programming interface (API) with a particular argument. The processor may then ascertain whether the argument is declared in the configurations, and provided the argument is declared, the manner in which the argument is declared. In response thereto, the processor may ascertain that the combination of the API call with the declaration, or lack of declaration, is cause for a flaw. For example, the processor may ascertain that an operation stores sensitive data to a container or file, but the configurations configure the container as publicly accessible or fail to encrypt the file.

In other cases, the processor identifies a problematic with the configuration subsystem. For combination beginning example, the processor may first identify a declaration in the configurations. The processor may then ascertain whether any of the operations calls an API with an argument declared by the declaration, and provided that an operation calls the API, the manner in which operation calls the API. In response thereto, the processor may ascertain that the combination of the declaration with the API call, or lack of API call, is cause for a flaw. For example, the processor may ascertain that a resource is declared in the configurations, thus exposing the resource to users of the system, but no operation uses the resource.

System Description

Reference is initially made to FIG. 1, which is a schematic illustration of a system 20 for analyzing a software system, in accordance with some embodiments of the present invention.

System 20 comprises a computer 22, such as a desktop or laptop computer. Computer 22 comprises a processor 24, configured to analyze a software system 50 including an application subsystem 52, which performs various operations defined in application code 42, and a configuration subsystem 53, which configures application subsystem 52 per configurations defined in configuration code 44.

Typically, computer 22 further comprises a network interface 26, such as a network interface controller (NIC). Using network interface 26, processor 24 may obtain, via a network 40 (e.g., the Internet), application code 42 and/or configuration code 44. Alternatively or additionally, the processor may obtain, via network 40, binary files compiled from application code 42 and/or configuration code 44, and/or a trace of the execution 49 of software system 50. (FIG. 1 depicts execution 49 spanning application subsystem 52 and configuration subsystem 53, given that execution 49 includes the execution of the application code in the context of the configuration code.)

For example, the application and configuration code may be stored, by the proprietor of the software system, remotely from computer 22, e.g., in a local area network (LAN) 30 of the proprietor. In such an instance, processor 24 may obtain the code from one or more computers 32 belonging to the proprietor. (It is noted that the code may be split among multiple storage drives in LAN 30, such as among the hard drives of different respective computers 32 belonging to the LAN.)

Based on the aforementioned code, binary files, and/or execution trace, processor 24 analyzes software system 50 so as to identify any flaws in the software system that result from a combination of the operations of the application subsystem with the configurations of the configuration subsystem. Typically, system 20 further comprises a display 28, and processor 24 is configured to display, on display 28, output from the analysis. Alternatively or additionally, the processor, using network interface 26, may communicate the output, via network 40, to a computer 32, and computer 32 may then display the output on another display 34.

In other embodiments, the processor of one of computers 32, rather than processor 24, performs the software-system analysis described herein. In such embodiments, the application code and configuration code may be stored locally on the analyzing computer, or the analyzing computer may obtain at least some of the code from another computer 32, using a suitable network interface. Output from the analysis may then be displayed on display 34.

In some cases, the configuration subsystem includes (i.e., the configuration code defines) a software infrastructure implemented on computers 32 and/or on one or more servers 38 belonging to a cloud-computing network 36, and the operations of the application subsystem are performed on the software infrastructure. In such cases, application code 42 may include multiple application (APP) modules 46 defining the operations performed by different respective services on the software infrastructure, each application module 46 being configured by a different respective configuration (CONFIG) module 48. Processor 24 may obtain code, binary files, and/or a trace of execution 49 from servers 38, for analysis of the software system.

In general, the configurations defined in configuration code 44 may configure the application subsystem in any suitable way. For example, the configurations may configure a process for testing the functionality of the application subsystem. (Such configurations may be defined using an open-source tool such as Jenkins, for example.) Alternatively or additionally, the configurations may configure (or "provision") a resource, such as a firewall or gateway, used by the application subsystem. Alternatively or additionally, the configurations may configure the deployment of the application subsystem. (Such configurations may be defined using an IaC tool such as Terraform by HashiCorp, Inc., for example.) Alternatively or additionally, the configurations may configure the runtime behavior of the application subsystem, e.g., by configuring load balancing between servers 38 on which the operations of the application subsystem are performed.

In general, processor 24 may be embodied as a single processor, or as a cooperatively networked or clustered set of processors. In some embodiments, the functionality of processor 24, as described herein, is implemented solely in hardware, e.g., using one or more Application-Specific Integrated Circuits (ASICs) or Field-Programmable Gate Arrays (FPGAs). In other embodiments, the functionality of processor 24 is implemented at least partly in software. For example, in some embodiments, processor 24 is embodied as a programmed digital computing device comprising a central processing unit (CPU). Program code, including software programs, and/or data are loaded for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Figure 2:
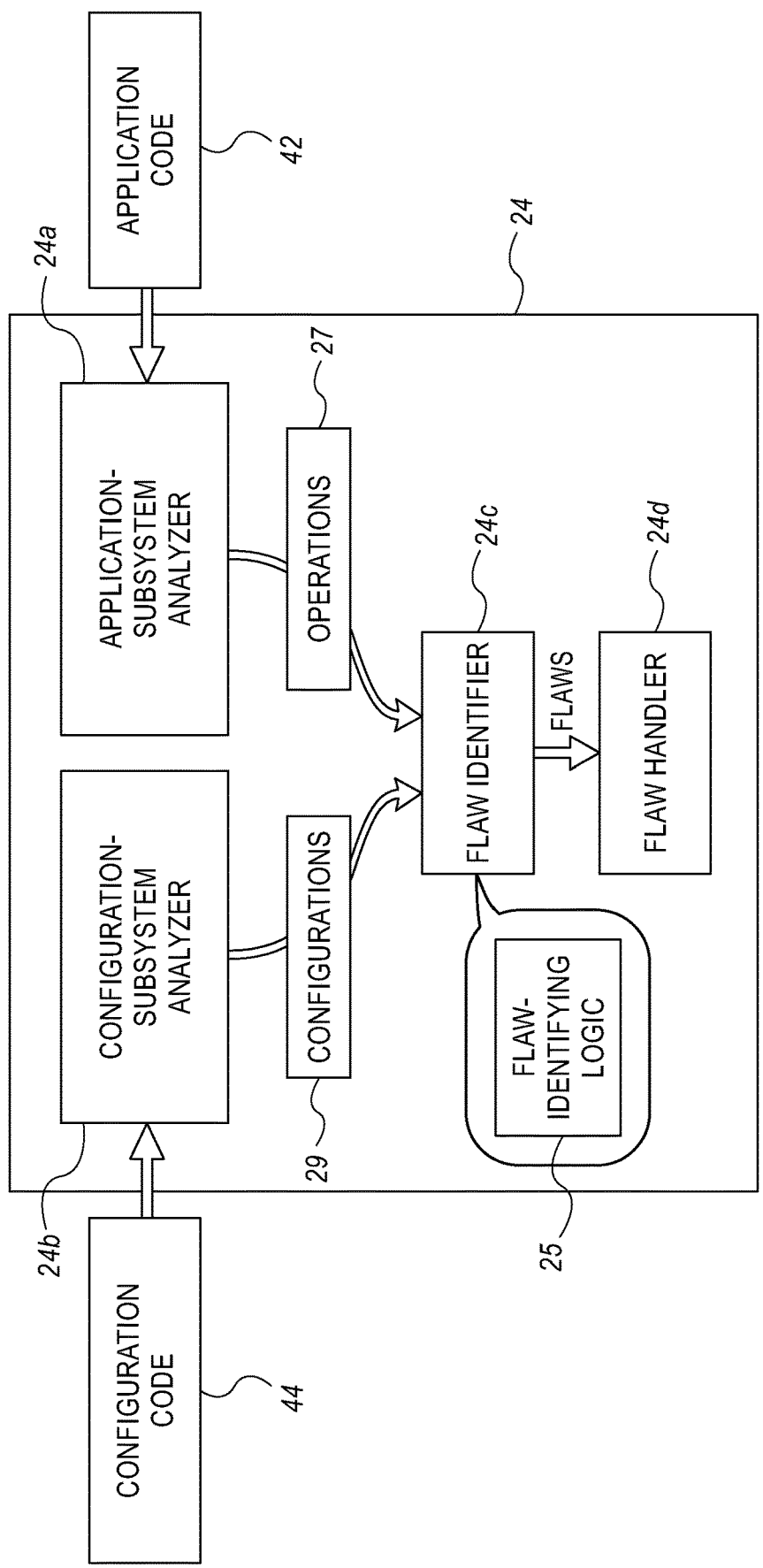
FIG. 2 shows an example module diagram, in accordance with some embodiments of the present invention.

For an example of software that may be executed by processor 24 (or by a processor of a computer 32) to perform the functionality described herein, reference is now additionally made to FIG. 2, which shows an example module diagram for such software, in accordance with some embodiments of the present invention.

Processor 24 is configured to analyze software system 50 so as to generate an output describing (i) one or more operations performed by the application subsystem, and (ii) one or more configurations for the application subsystem, which are provided by the configuration subsystem. (It is noted that this output is typically not exposed to any users of system 20.) Typically, each of the subsystems is analyzed by a different respective software module executed by the processor; in particular, an application-subsystem analyzer 24a analyzes the application subsystem, while a configuration-subsystem analyzer 24b analyzes the configuration subsystem. The output of the analysis thus includes two components: a first component 27, which describes the operations and is output by application-subsystem analyzer 24a, and a second component 29, which describes the configurations and is output by configuration-subsystem analyzer 24b.

In some embodiments, application-subsystem analyzer 24*a* analyzes the application subsystem by parsing application code 42. In response to parsing the application code, the application-subsystem analyzer may build a data-flow graph (DFG) describing the operations of the application subsystem, e.g., as described in U.S. Pat. No. 9,128,728 to Siman, whose disclosure is incorporated herein by reference. (Each node of the DFG corresponds to a statement that uses a variable, such as an assignment of a value to the variable or the use of the variable in a function call, and the edges of the DFG represent the dependencies between these statements.) Alternatively or additionally, the application-subsystem analyzer may build a document object model (DOM) describing the operations, e.g., as described in U.S. Pat. No. 9,128,728 to Siman. First component 27 may thus include a DFG, a DOM, and/or any other suitable data structure that describes the operations, such as a control-flow graph (CFG) or call graph (CG).

Alternatively or additionally, the application-subsystem analyzer may analyze binary files compiled from the application code, and generate first component 27, which may comprise any suitable data structure, in response thereto.

Similarly, configuration-subsystem analyzer 24*b* may analyze the configuration subsystem by parsing the configuration code. In response to configuration parsing code, the configuration-subsystem analyzer may build a Javascript Object Notation (JSON) structure, an Extensible Markup Language (XML) structure, and/or any other suitable data structure describing the configurations, such as a data structure convertible to JSON. Second component 29 may thus include any of these data structures. Alternatively or additionally, the configuration-subsystem analyzer may analyze binary files compiled from the configuration code, and generate second component 29, which may comprise any suitable data structure, in response thereto.

Alternatively or additionally, the application-subsystem analyzer or the configuration-subsystem analyzer may run application code 42, in the context of the configurations, using any suitable execution tracer, e.g., as described in US Patent Application Publication 2018/0330102 to Siman et al., whose disclosure is incorporated herein by reference. Subsequently, the application-subsystem analyzer may generate first component 27, and the configuration-subsystem analyzer may generate second component 29, by querying the resulting trace of execution 49.

In other embodiments, the processor executes a single analysis module, which generates a single-component output describing both the operations and the configurations. Such an output may include, for example, an execution trace generated by running the application code as described above.

Typically, the software executed by processor 24 further includes a flaw identifier 24*c*, which is configured to identify, based on the output from the analysis module(s), any flaw that results from a combination of the operations with the configurations. In other words, flaw identifier 24*c* correlates between the operations and configurations so as to identify any flaws. Typically, flaw identifier 24*c* performs this identification by querying the data structures that describe the operations and configurations. A list of predefined queries for identifying operations and configurations of various types, along with rules for interpreting the results of the queries so as to identify any flaws, are specified in flaw-identifying logic 25. The queries may be executed in any suitable query language, such as any query language described in U.S. Pat. No. 9,128,728 or US Patent Application Publication 2018/0330102, the respective disclosures of which are incorporated herein by reference.

Typically, the software executed by processor 24 further includes a flaw handler 24*d*. In response to flaw identifier 24*c* identifying at least one flaw, flaw handler 24*d* may output an indication of the flaw. For example, the flaw handler may display (e.g., on display 28) a warning indicating the flaw, the warning optionally including references to particular portions of application code 42 and/or configuration code 44 that are cause for the flaw.

Alternatively or additionally to outputting an indication of the flaw, the flaw handler may automatically modify configuration code 44 so as to correct the flaw. For example, the flaw handler may add a configuration to, remove a configuration from, or modify an existing configuration in configuration code 44. As specific examples, the flaw handler may add new authorization requirements to an API, remove the declaration of a port or another resource that is not used by the application subsystem, change the declaration of a resource so as to limit access thereto, or add a whitelist or blacklist of users to the configuration code.

Alternatively to automatically correcting a flaw, the flaw handler may output a proposed correction to the flaw, such as any of the example corrections described above.

It is emphasized that the module diagram in FIG. 2 is provided by way of example only, and that processor 24 may perform the functionality described herein using any suitable set of software and/or hardware modules.

Identifying Flaws

Figure 3A:
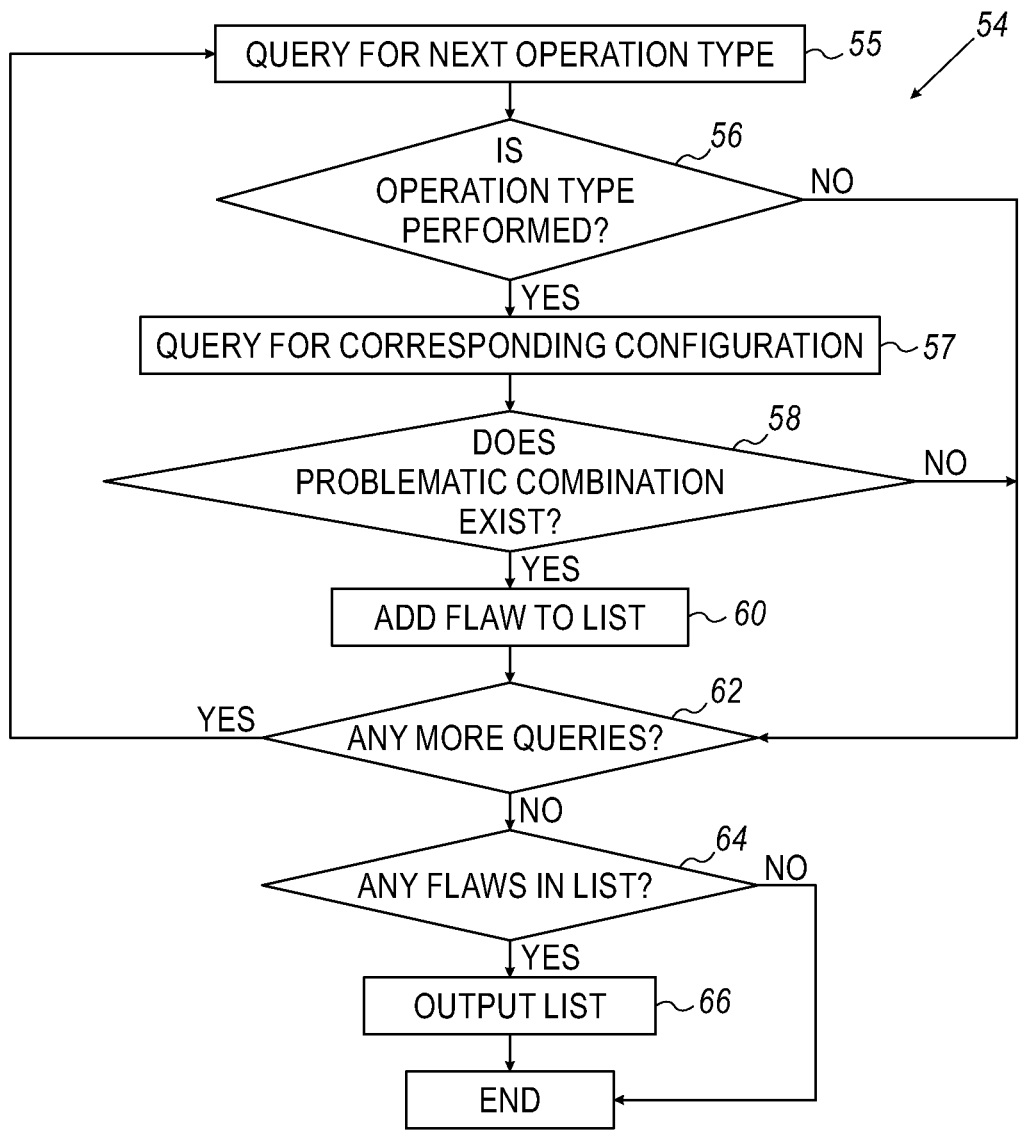
FIGS. 3A-B are flow diagrams for example algorithms for identifying flaws in a software system, in accordance with some embodiments of the present invention.

Reference is now made to FIG. 3A, which is a flow diagram for an example algorithm 54 for identifying flaws in software system 50 (FIG. 1), in accordance with some embodiments of the present invention. Algorithm 54 is executed by the processor subsequently to generating data structures describing the operations and configurations. Typically, most of the steps of algorithm 54 are performed by flaw identifier 24*c* (FIG. 2), with the last one or two steps being performed by flaw handler 24*d*.

Per algorithm 54, the processor queries the data structure describing the operations as to identify any of the operations performed by the application subsystem that are potentially cause for a flaw. For example, the processor may query the operations data structure for API calls in which the operations interface with external services or resources in a potentially security-compromising manner. An example of such an API call is a call to the API "SaveData" with the arguments "credit_card_num" and "MY_FILE," per which the operation saves sensitive data assigned to the local variable credit_card_num to the file assigned to the environment variable MY_FILE. (The processor may ascertain that sensitive data is assigned to credit_card_num by applying a machine-learned classifier, which is trained to identify names of variables to which sensitive data are likely assigned, to the string "credit_card_num.")

For each of the identified operations, the processor queries the data structure describing the configurations so as to check whether the configurations allow the flaw to be realized. For example, for each potentially security-compromising API call, the processor may query the configurations data structure for the definition of the API and/or for the declaration of at least one of the arguments to the API call. (If the API call is in an application module 46 (FIG. 1), the processor typically queries the portion of the configurations data structure that describes the configuration module 48 corresponding to the application module.) For example, continuing the example above, the processor may query the configurations data structure for a declaration of the environment variable MY_FILE.

Subsequently, based on the result of the second query, the processor ascertains whether the combination of the operation with the configurations is cause for a flaw. For example, continuing the example above, the processor may ascertain whether MY_FILE is declared as an encrypted file. If MY_FILE is declared without encryption, the processor may identify the combination of the API call with the declaration of MY_FILE as for a flaw. (Many cause other examples of problematic combinations are provided below, e.g., in the Additional Examples subsection of the present description.)

More specifically, at an operations-querying step 55, the processor queries the operations data structure for a specific type of operation (e.g., communication or saving of sensitive data), as specified by flaw-identifying logic 25 (FIG. 2). Based on the results of the query, the processor ascertains, at a first query-result-assessing step 56, whether the type of operation is performed. If yes, the processor, at a corresponding-configuration-querying step 57, queries the configurations data structure for a corresponding configuration, i.e., a configuration whose presence or absence may allow the flaw potentially caused by the operation to be realized. The corresponding configuration is also specified by flaw-identifying logic 25.

Next, based on flaw-identifying logic 25, the processor ascertains, at a combination-assessing step 58, whether the combination of the operation with the presence or absence of the configuration is problematic, i.e., cause for a flaw. If the combination is cause for a flaw, the processor adds the flaw to a list of flaws, at a list-augmenting step 60. For example, the processor may add the line of application code in which the operation is defined along with the line of configuration code containing the corresponding configuration. Optionally, the processor may further add a description of the flaw (e.g., "sensitive data stored to unencrypted file"). The processor may further add a suggested correction for the flaw (e.g., by adding an existing file declaration modified so as to encrypt the file).

Subsequently to performing list-augmenting step 60, the processor checks, at a checking step 62, whether any more queries for operation types are specified by flaw-identifying logic 25. Similarly, the processor performs checking step 62 if the queried-for operation type is not performed, or if the combination of the operation with the configurations does not allow a flaw to be realized. If at least one more query for operation types remains, the processor returns to operations-querying step 55.

Subsequently to ascertaining, at checking step 62, that no queries for operation types remain, the processor checks, at a list-checking step 64, whether the list contains any flaws. If yes, the processor, at a list-outputting step 66, outputs the list so as to indicate the flaws. The output may be performed via any suitable output device, such as display 28 or display 34 (FIG. 1), network interface 26 (FIG. 1), and/or an audio speaker.

In alternate embodiments, the analysis of the configuration subsystem is performed during the execution of algorithm 54, rather than prior to the execution of algorithm 54. For example, in response to identifying an API call with an argument at first query-result-assessing step 56, the processor may analyze the configuration subsystem (e.g., by parsing the configuration code) so as to find the declaration of the argument.

Some problematic combinations—for example, the exposure, by the configurations, of a resource that is unused by the operations—are best identified by first querying the configurations data structure, and only subsequently querying the operations data structure. Hence, the processor may use other algorithms, alternatively or additionally to algorithm 54, to identify such combinations.

Figure 3B:
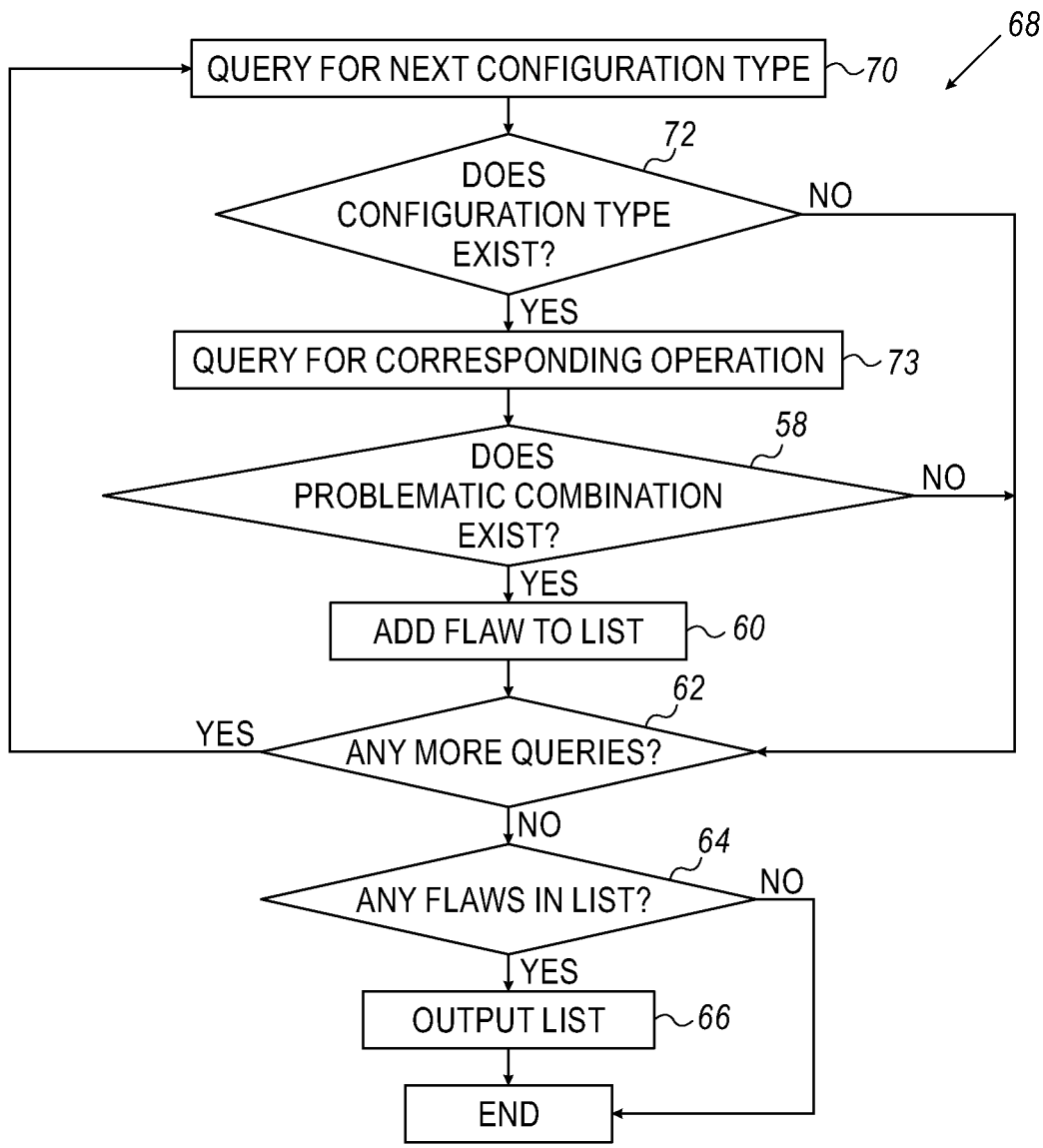

In this regard, reference is now made to FIG. 3B, which is a flow diagram for another example algorithm 68 for identifying flaws in software system 50, in accordance with some embodiments of the present invention. Per algorithm 68, the processor identifies any of the configurations that are potentially cause for a flaw. For each of the identified configurations, the processor checks whether the operations allow the flaw to be realized. Typically, most of the steps of algorithm 68 are performed by flaw identifier 24c (FIG. 2), with the last one or two steps being performed by flaw handler 24d.

More specifically, at a configurations-querying step 70, the processor queries the configurations data structure for a specific type of configuration (e.g., the declaration of a specific type of resource), as specified by flaw-identifying logic 25. As a purely illustrative example, the processor may find any ports exposed by the configurations by executing the query open_port:=Find_in_Config ("Deployment.spec.template.spec.ports.containerPort"), which queries the configurations data structure for any port numbers declared in a Kubernetes path "Deployment.spec . . . ."

Based on the results of the query, the processor ascertains, at a second query-result-assessing step 72, whether the type of configuration exists. If yes, the processor, at a corresponding-operation-querying step 73, queries the operations data structure for a corresponding operation, i.e., an operation whose performance or lack thereof may allow the flaw potentially caused by the configuration to be realized. The corresponding operation is also specified by flaw-identifying logic 25. Continuing the example above, after ascertaining that the query result "open_port" is not null, the processor may find any port numbers used by the operations by executing the query used ports: =Find_in_App ("ServerSocket. New"), which queries the operations data structure for any port number used in the instantiation of a Java ServerSocket object.

Next, the processor performs combination-assessing step 58, as described above with reference to FIG. 3A. If the combination is cause for a flaw, the processor performs list-augmenting step 60, as described above with reference to FIG. 3A. Continuing the example above, the processor may identify a flaw if at least one result in "open_port" is not included in "used_port."

Subsequently, the processor checks, at checking step 62, whether any more queries for configuration types are specified by flaw-identifying logic 25. Similarly, the processor performs checking step 62 if the queried-for configuration type does not exist, or if no problematic combination with the configuration type exists. If at least one more query for configuration types remains, the processor returns to configurations-querying step 70.

Subsequently to ascertaining, at checking step 62, that no queries for configuration types remain, the processor performs list-checking step 64 and, optionally, list-outputting step 66, as described above with reference to FIG. 3A.

In alternate embodiments, the analysis of the application subsystem is performed during the execution of algorithm 68, rather than prior to the execution of algorithm 68. For example, in response to identifying, at second query-result-assessing step 72, a configuration that includes a declaration, the processor may analyze the application subsystem (e.g., by querying a DFG) so as to ascertain whether the operations include an API call with an argument declared by the declaration.

Notwithstanding FIGS. 3A-B, it is noted that, in some cases, a problematic combination (i.e., a combination that is cause for a flaw) may include multiple operations and/or multiple configurations. In such cases, identifying the combination may comprise querying the operations data structure multiple times and/or querying the configurations data structure multiple times.

For example, the processor may first identify an operation that includes the API call "HttpPost (MY_URL)." The processor may then identify, in the configurations, a declaration of MY_URL in which MY_URL is assigned the address of a particular service and port (e.g., "http://ServiceB:8180"). The processor may then return to the operations, and identify another API call "HttpPost (Url)," where Url is assigned the value "http://ServiceB:"+MY_PORT. The processor may then return to the configurations, and identify a declaration of MY_PORT in which MY_PORT is assigned the value "8180." The processor may therefore identify the combination of the two aforementioned API calls with the two aforementioned declarations as cause for a flaw, given that this combination causes two Hypertext Transfer Protocol (HTTP) POST operations to post to the same service and port.

Additional Examples

The following are additional examples of flaws in software system 50 (FIG. 1) resulting from a combination of the operations of the application subsystem with the configurations of the configuration subsystem. Each of the example flaws below may be identified using any of the techniques described above with reference to FIGS. 3A-B, and/or any other suitable techniques.

One common type of flaw results from the manner in which the configurations configure an API or any other resource used by one of the operations. Examples of this type include the following:

(i) The operation exchanges data with a resource (e.g., a cloud storage bucket or message bus) to which access by users who are unauthorized to access the data is permitted by the configurations, e.g., by virtue of the configurations allowing public access to the resource, thus compromising security. Such a resource may include a from which the operation receives data, or a "sink" that receives data from the operation.

As a specific example, the application code may include a command to send sensitive data (e.g., a credit card number or an encryption key) to the ActiveMQ message bus, while the configurations may configure the m message bus with the flag "anonymousAccessAllowed" set to "true," thus exposing the sensitive data to unauthorized users. As another example, one of the operations may write sensitive data to a file for which the configurations do not provide encryption, e.g., by virtue of Kubernetes Secrets not being used to manage the file.

(ii) The configurations configure a sensitive resource used by the operation as accessible from the Internet, thus resulting in a security vulnerability regardless of whether data is exchanged with the resource.

(iii) The resource includes a log to which the operation writes data, but the configurations do not configure the log to be stored persistently, thus compromising the security and/or performance of the system by limiting auditing capabilities.

Other example flaws include the following:

(iv) The configurations configure the building of the application code with the enablement of a debug mode. By virtue of the debug mode being enabled, the operations generate an output, including sensitive data, that compromises the security of the software system.

(v) The operations are not properly tested by a testing process that is configured by the configurations. For example, the operations may deploy multiple versions of an API, but the configurations may configure the testing process so as to test one version but not another version, thus compromising the performance and/or security of the software system.

(vi) The configurations configure a resource, such as a firewall or gateway, with permissive policies not required by the application subsystem (i.e., by any of the operations), thus unnecessarily compromising the security of the software system.

(vii) The configurations configure a resource improperly, in view of the manner in which the resource is used by the application subsystem, thus compromising the performance and/or security of the software system. For example, the configurations may provision a virtual machine on which the application code is run with lower memory than is required by the application code, this flaw being cause, for example, for a denial of service.

(viii) The configurations configure the deployment of the application subsystem in a manner that exposes sensitive services, which should be exposed only to other services in the application subsystem, to a user of the software system, thus compromising the security of the system. The sensitivity of the service is a function of the operations performed by the service; for example, operations that handle sensitive data may render the service sensitive, such that the service should not be exposed to the user.

(ix) The configurations configure the runtime behavior of the application subsystem in a manner that is improper in view of the operations, thus compromising security and/or performance. For example, the load balancing amongst servers 38 (FIG. 1) configured by the configurations may be insufficient for allowing the operations to be executed effectively. As another example, one of the operations may be non-idempotent but may be allowed, by the configurations, to be executed multiple times without deduplication.

(x) The configurations allow a particular one of the operations (e.g., deletion or modification of a file containing sensitive data) to be performed without prior authentication of the user of the application subsystem, thus compromising security and/or performance.

(xi) One of the operations sends unencrypted data without the configurations providing a mechanism for securing the unencrypted data, thus compromising the security of the system. For example, the operation may send the unencrypted data from one service to another service without the configurations properly configuring the service mesh so as to secure the data.

(xii) One of the operations is vulnerable to a particular type of attack for which the configurations do not provide a protection mechanism. For example, a query or command may be vulnerable to an injection attack, and the configurations may fail to configure an API gateway for protecting against such an attack.

(xiii) The configurations expose a resource (e.g., a port, authentication token, or API) not used by the application subsystem (i.e., by any of the operations), thus unnecessarily compromising the security of the system.

(xiv) The configurations configure two services in the application subsystem to use a common resource, thus causing greater security vulnerability. For example, the operations of a first service may include use of (e.g., a query to) a database represented by a first environment variable, and the operations of a second service may include the use of a database represented by a second environment variable. The configurations, however, may assign the same database connection string to the first and second environment variables, such that the two services use the same database, and hence, both services are vulnerable to an attack on the database.

(xv) The configurations configure a service in the application subsystem to have a position, such as a front-end (i.e., user-facing) position, in a topology of the application subsystem that renders the service susceptible to a particular type of attack associated with a particular one of the operations performed by the service. For example, the service may present a webpage to MY_ADDRESS, but the configurations may configure the service as a front-end service by virtue of assigning an external URL to MY_ADDRESS, thus rendering the service susceptible to a cross-site scripting attack.

(xvi) A first service in the application subsystem transfers data to an address (e.g., an environment variable or URL) that is assigned, by the configurations, to a second service in the application subsystem, and the second service writes to a location (e.g., a log) to which access by users who are unauthorized to access the data is permitted, thus compromising the security of the system. (It is noted that in this case, the problematic combination includes two operations-namely, the transferring of the data and the writing of the data.)

(xvii) A first service in the application subsystem transfers a query (e.g., a database query, such as a Structured Query Language (SQL) query) or a command to an address (e.g., an environment variable or URL) that is assigned, by the configurations, to a second service in the application subsystem, and the second service does not provide a defense against an injection attack. For example, the second service may lack validation or sanitation logic.

(xviii) One of the operations conflicts with one of the configurations, e.g., by virtue of reserving different respective amounts of memory for the same write operation, thus compromising security and/or performance.

Table 1 below lists examples (i)-(xviii) described above, summarizing, for each example, the properties of the operations and configurations that, in combination, cause a flaw in the software system.

TABLE 1

| Example | Operations | Configurations |
|---|---|---|
| (i) | Data exchanged with resource | Users unauthorized to access data permitted to access resource |
| (ii) | Sensitive resource used | Public access to resource allowed |
| (iii) | Data written to log | Log not stored persistently |
| (iv) | Output of sensitive data provided debug mode enabled | Debug mode enabled |
| (v) | Operations require testing | Operations requiring testing are not tested |
| (vi) | Operations do not require permissive policies for a resource | Resource configured with permissive policies |

TABLE 1-continued

| Example | Operations | Configurations |
|---|---|---|
| (vii) | Operations require proper configuration of particular resource | Particular resource configured improperly |
| (viii) | Operations render service sensitive | Deployment exposes sensitive service to user |
| (ix) | Operations require proper runtime configuration | Improper runtime configuration |
| (x) | Sensitive operation | No authentication required |
| (xi) | Sending of unencrypted data | No securing of unencrypted data |
| (xii) | Operation vulnerable to attack | No provision of protection from attack |
| (xiii) | Operations do not use particular resource | Particular resource exposed |
| (xiv) | Two services call APIs with respective arguments | Arguments assigned to same resource |
| (xv) | Operation performed by service associated with particular type of attack | Service configured to have position rendering service susceptible to particular type of attack |
| (xvi) | First service transfers data to particular address, second service writes to location to which access by users unauthorized to access data is permitted | Particular address assigned to second service |
| (xvii) | First service transfers query or command to particular address, second service does not provide defense against injection attack | Particular address assigned to second service |
| (xviii) | Any operation | Configuration conflicting with operation |

Figure 4:
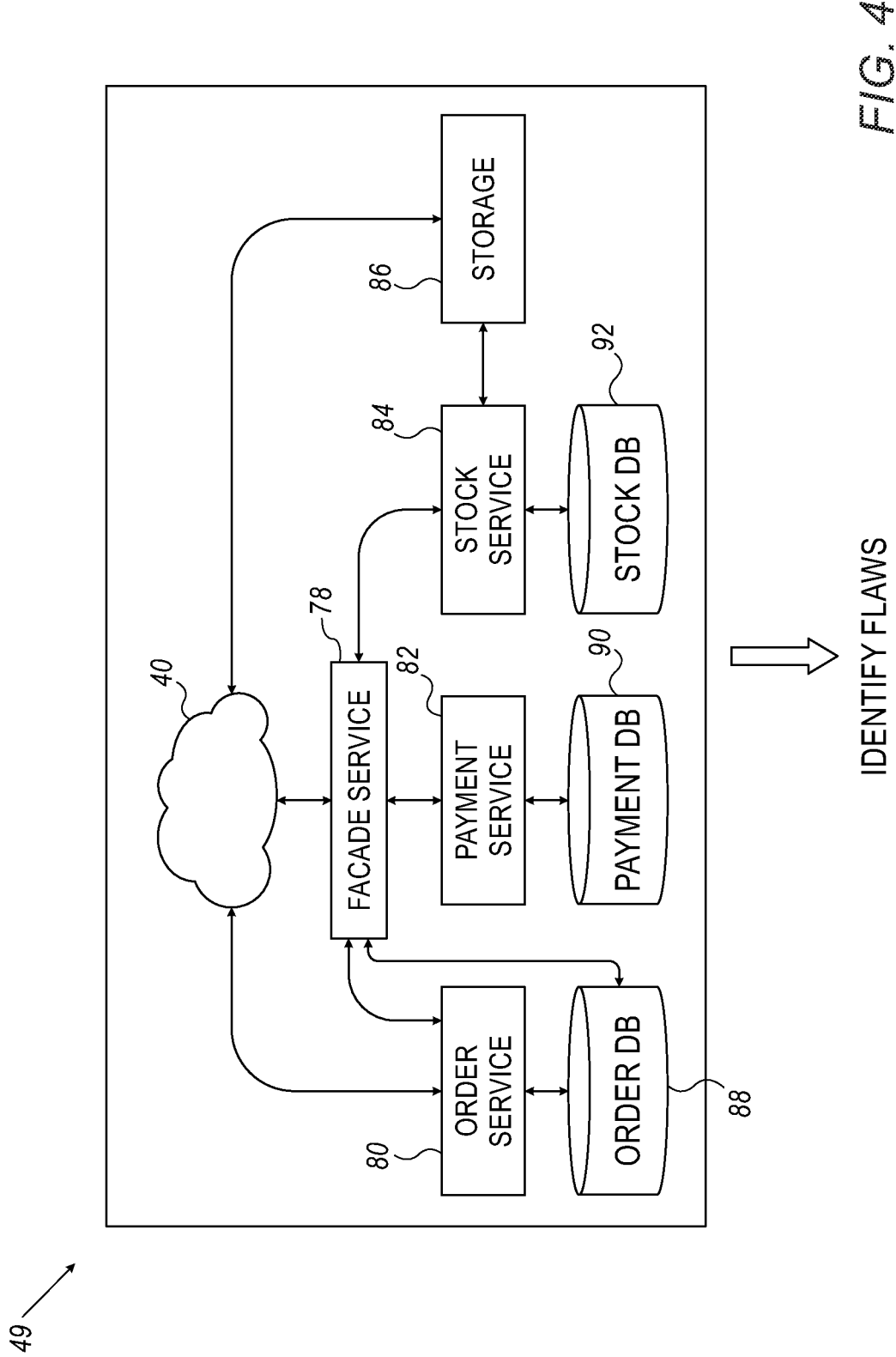
FIG. 4 is a schematic illustration of an example execution of a software system, in accordance with some embodiments of the present invention.

Reference is now made to FIG. 4, which is a schematic illustration of an example execution 49 of software system 50 (FIG. 1), in accordance with some embodiments of the present invention.

In the example shown in FIG. 4, software system 50, when executed, implements a cloud-based sales application on cloud-computing network 36 (FIG. 1). In this application, a façade service 78 receives queries, orders, and payment information from users via network 40. Façade service 78 sends the queries to a stock service 84, which, in response to each received query, queries a stock database (DB) 92 and returns the result of the query to the façade service. The façade service sends the orders to an order service 80, which enters each received order into an order database 88. (Order service 80 may further query order database 88 and return the results of the queries to the façade service.) The façade service sends the payment information to a payment service 82, which enters the information into a payment database 90.

FIG. 4 further shows a data storage 86, which is used by stock service 84 but is also directly accessible via the Internet. Order service 80 is also directly accessible via the Internet, and order database 88 is directly accessible to the façade service.

As described above with reference to FIG. 1, the functionality of each service may be defined in a different respective application module 46, and may be configured in a different respective configuration module 48. Typically, the configurations further include a configuration of the service mesh, which handles communication between the services.

In this scenario, processor 24 (FIG. 1) may identify various flaws resulting from a combination of the operations of the application subsystem with the configurations of the configuration subsystem.

For example:

(a) As an instance of examples (i) and (ii) above, the processor may ascertain, from the application code, that the stock service writes sensitive data to storage 86, but the configurations allow direct access to storage 86 by any user via the Internet.

(b) As an instance of example (ix) above, the processor may identify that the application code for the façade service includes an HTTP POST of payment information to the payment service, but the configuration of the service mesh allows multiple retries of this operation without deduplication. This flaw allows an attacker to cause a payment to be executed multiple times.

(c) As an instance of example (xiv) above, the processor may identify that the façade service and order service share a common resource-namely, the order database.

(d) As an instance of example (xv) above, the processor may ascertain that the order service has a front-end position in the topology of the application subsystem, i.e., the order service is directly accessible via the Internet, such that the order service is susceptible to a cross-site scripting attack and/or may receive untrusted data that requires validation.

Prioritization

In some embodiments, in the event that the processor identifies multiple flaws in the software system, the processor (e.g., flaw handler 24d (FIG. 2)) computes an order of priority for correcting the flaws. Subsequently, the processor outputs the indication of the flaws so as to indicate the order of priority. For example, the processor may list the flaws in the order of priority, typically with the flaw having the highest priority for correction listed first. Alternatively or additionally, the processor may define a numerical or alphabetical scale for the priorities (e.g., a scale of 1-10 or {"high priority," "medium priority," and "low priority"}), and output, together with the indication of each flaw, the number or alphabetical string, from the scale, that corresponds to the priority computed for the flaw.

In general, the processor may base the order of priority on any suitable factors.

For example, if the flaws include multiple security vulnerabilities associated with different respective resources, the processor may compute the order of priority such that correcting any one of the security vulnerabilities associated with one of the resources that is configured, by the configurations, as accessible from the Internet is prioritized over correcting any other one of the security vulnerabilities associated with another one of the resources that is not configured, by the configurations, as accessible from the Internet. Thus, for example, the processor may prioritize correcting a security vulnerability associated with a public message bus over correcting another security vulnerability associated with a private message bus.

Alternatively or additionally, the processor may first ascertain, based on the operations and configurations, different respective positions, in the topology of the application subsystem, of the services in the application subsystem. This may be done by identifying operations in which services exchange data, along with configurations in which the API arguments used for the data exchanges are defined.

For example, with reference to FIG. 4, the processor may ascertain that façade service 78 is a front-end service, based on (a) a call, by the façade service, to a data-exchanging API with an argument "MY_URL," and (b) a configuration in which the environment variable "MY_URL" is assigned an external URL (i.e., a URL including a domain external to the software system). The processor may further ascertain that payment service 82 is a back-end service that communicates with façade service 78, based on (a) a call, by the payment service, to a data-exchanging API with an argument "SERVICE1," (b) a configuration in which the environment variable "SERVICE1" is assigned the address of the façade service, and (c) the lack of any exchange of data by the payment service with an external website.

Subsequently, the processor may compute the order of priority based on the positions.

For example, the processor may compute the order of priority based on different respective levels of security vulnerability associated with the positions. Thus, for example, given a particular type of flaw (e.g., leakage of sensitive data) identified in both the façade service and the payment service, the processor may compute a higher priority for correcting the flaw in the façade service, given that a front-end service is, in general, more vulnerable to an attack capitalizing on the flaw.

Alternatively or additionally, the processor may compute the order of priority such that correcting a first flaw affecting one of the services that exchanges data with a greater number of others of the services is prioritized over correcting a second flaw affecting another one of the services that exchanges data with a lesser number of others of the services. For example, the processor may prioritize correcting a flaw that renders the façade service vulnerable to a denial-of-service (DOS) attack over correcting a similar type of flaw affecting the payment service. Since the façade service exchanges data with three other services, while the payment service exchanges data with only one other service, a DOS attack on the façade service is likely to affect the software system more, relative to a Dos attack on the payment service.

It will be appreciated by persons skilled in the art that the present invention is not limited to what has been particularly shown and described hereinabove. Rather, the scope of embodiments of the invention includes both present combinations and subcombinations the of various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
an output device; and
a processor, configured to:
analyze a software system, which includes an application subsystem comprising application code and a configuration subsystem comprising infrastructure as code (IaC), which defines a software infrastructure on which the application code is to run, so as to generate an output describing (i) one or more operations performed by the application subsystem, and (ii) one or more configurations provided for the application subsystem by the software infrastructure,
based on the output, identify at least one flaw in the software system that results from a performed by the combination of the operations application subsystem with the configurations provided by the software infrastructure defined by the IaC, and in response to identifying the flaw, output, via the output device, an indication of the flaw.

2. The system according to claim 1, wherein the processor is configured to identify the flaw based on a manner in which the configurations configure a resource used by one of the operations.

3. The system according to claim 2, wherein the processor is configured to identify the flaw in response to the configurations configuring the resource as accessible from an Internet.

4. The system according to claim 2, wherein the operation exchanges data with the resource, and wherein the processor is configured to identify the flaw in response to the configurations permitting access to the resource by users who are unauthorized to access the data.

5. The system according to claim 1, wherein the application subsystem includes software code that defines the operations, and wherein the processor is configured to analyze the software system by parsing the software code.

6. The system according to claim 1, wherein the application subsystem includes software code that defines the operations, and wherein the processor is configured to analyze the software system by running the code.

7. The system according to claim 1,
wherein the at least one flaw includes multiple flaws,
wherein the processor is further configured to compute an order of priority for correcting the flaws, and
wherein the processor is configured to output the indication so as to indicate the order of priority.

8. The system according to claim 7,
wherein the processor is further configured to ascertain, based on the configurations and operations, different respective positions, in a topology of the application subsystem, of multiple services in the application subsystem, and
wherein the processor is configured to compute the order of priority based on the positions.

9. The system according to claim 7, wherein the flaws include multiple security vulnerabilities associated with different respective resources, and wherein the processor is configured to compute the order of priority such that correcting any one of the security vulnerabilities associated with one of the resources that is configured, by the configurations, as accessible from an Internet is prioritized over correcting any other one of the security vulnerabilities associated with another one of the resources that is not configured, by the configurations, as accessible from the Internet.

10. The system according to claim 1, wherein the software infrastructure defined by the IaC comprises microservices.

11. The system according to claim 10, wherein the software infrastructure defined by the IaC further comprises a service mesh, over which the microservices communicate with one another.

12. A method, comprising:
using a processor, analyzing a software system, which includes an application subsystem comprising application code and a configuration subsystem comprising infrastructure as code (IaC), which defines a software infrastructure on which the application code is to run, so as to generate an output describing (i) one or more operations performed by the application subsystem, and (ii) one or more configurations provided for the application subsystem by the software infrastructure;
based on the output, identifying at least one flaw in the software system that results from a combination of the operations performed by the application subsystem with the configurations provided by the software infrastructure defined by the IaC; and
in response to identifying the flaw, outputting an indication of the flaw.

13. The method according to claim 12, wherein identifying the flaw comprises identifying the flaw based on a manner in which the configurations configure a resource used by one of the operations.

14. The method according to claim 13, wherein identifying the flaw comprises identifying the flaw in response to the configurations configuring the resource as accessible from an Internet.

15. The method according to claim 12, wherein the application subsystem includes software code that defines the operations, and wherein analyzing the software system comprises analyzing the software system by parsing the software code.

16. The method according to claim 12, wherein the application subsystem includes software code that defines the operations, and wherein analyzing the software system comprises analyzing the software system by running the code.

17. The method according to claim 12,
wherein the at least one flaw includes multiple flaws,
wherein the method further comprises computing an order of priority for correcting the flaws, and
wherein outputting the indication comprises outputting the indication so as to indicate the order of priority.

18. The method according to claim 17, further comprising ascertaining, based on the configurations and operations, different respective positions, in a topology of the application subsystem, of multiple services in the application subsystem,
wherein computing the order of priority comprises computing the order of priority based on the positions.

19. The method according to claim 17, wherein the flaws include multiple security vulnerabilities associated with different respective resources, and wherein computing the order of priority comprises computing the order of priority such that correcting any one of the security vulnerabilities associated with one of the resources that is configured, by the configurations, as accessible from an Internet is prioritized over correcting any other one of the security vulnerabilities associated with another one of the resources that is not configured, by the configurations, as accessible from the Internet.

20. A computer software product comprising a tangible non-transitory computer-readable medium in which program instructions are stored, which instructions, when read by a processor, cause the processor to:
analyze a software system, which includes an application subsystem comprising application code and a configuration subsystem comprising infrastructure as code (IaC), which defines a software infrastructure on which the application code is to run, so as to generate an output describing (i) one or more operations performed by the application subsystem, and (ii) one or more configurations provided for the application subsystem by the software infrastructure,
based on the output, identify at least one flaw in the software system that results from a combination of the operations performed by the application subsystem with the configurations provided by the software infrastructure defined by the IaC, and
in response to identifying the flaw, output an indication of the flaw.

* * * * *